Patented Feb. 28, 1933

1,899,058

UNITED STATES PATENT OFFICE

MARION C. REED, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.   Application filed October 7, 1929. Serial No. 398,104.

This invention relates to the art of preserving rubber, either in a vulcanized or unvulcanized condition, and to rubber compositions so preserved.

It is well known that rubber deteriorates more or less rapidly upon aging, especially when exposed to light, heat, or air. It has heretofore been proposed to retard such deterioration by treating the rubber, either before or after vulcanization, with so-called "anti-oxidants" or "age-resisters", such as amino compounds, hydroxy compounds, and aldehyde-amine condensation products.

The present invention, briefly stated consists in treating rubber with a member of a class of anti-oxidants which has been found to be unusually effective in retarding the deterioration of rubber compositions. This class of compounds includes substances possessing the structural formula

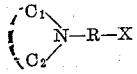

where $C_1$ and $C_2$ are terminal carbon atoms of a saturated or unsaturated chain, R is an aromatic nucleus directly attached to the nitrogen atom, and X is a hydroxyl, nitroso, or amino group.

Preferably $C_1$ and $C_2$ are the terminal carbon atoms of a saturated chain which may or may not contain other atoms than carbon, the substituents on the various atoms of the chain, and particularly on the terminal carbon atoms $C_1$ and $C_2$, if other than hydrogen, preferably being monovalent radicals which do not contain double bonds, such as alkyl, alkoxy, hydroxy, etc. Substituents containing doubly bound oxygen, such as carboxyl and carbonyl groups, tend to decrease the effectiveness of the compounds as anti-oxidants. The group R may be any aromatic nucleus such as a benzene or naphthalene nucleus. The activity of the compound is somewhat affected by the position of the substituent group X. For example, if R is a benzene nucleus, the compounds containing the substituent X in the ortho position are more active than those in which it occupies the meta position, while compounds in which it takes the para position are still more active.

Although the compounds in which the aromatic nucleus is unsubstituted, or contains other substituents, such as amino or nitroso groups, are active anti-oxidants, the hydroxy substituted compounds appear to be the most valuable, because of their ease of preparation, great activity as anti-oxidants, and negligible effect on the vulcanization of the rubber.

The following compounds, for example, are typical members of the hereinabove defined class of anti-oxidants:

p-phenylamino N-phenyl morpholine, p-hydroxy N-phenyl piperidine, o-hydroxy N-phenyl morpholine, p,p' dihydroxy diphenyl piperazine, p,p' dinitroso diphenyl piperazine, p-hydroxy N phenyl morpholine, p-amino N phenyl morpholine, hydroxy N-naphthyl morpholine, 2 methyl, 4 hydroxy N-phenyl tetra-hydro 1,4 thiazine,

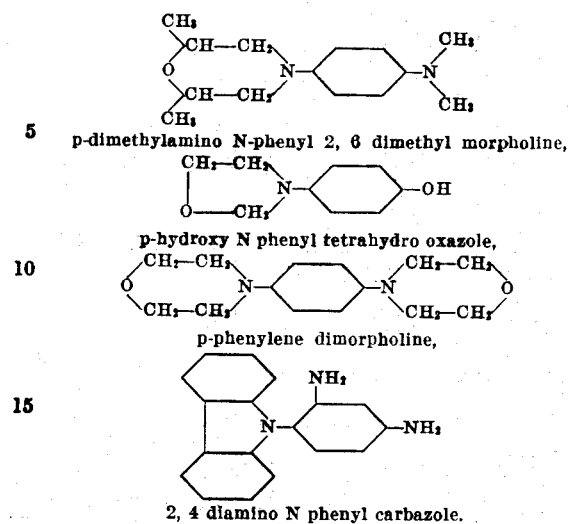

p-dimethylamino N-phenyl 2, 6 dimethyl morpholine, p-hydroxy N phenyl tetrahydro oxazole, p-phenylene dimorpholine, 2, 4 diamino N phenyl carbazole.

It will be noted that each of these compounds contains an aromatic nucleus (preferably with a hydroxyl, nitroso, or amino group—including secondary and tertiary amino groups—substituted in the para position) attached to the nitrogen of a heterocyclic ring. That is, the nitrogen which is attached to the aromatic nucleus is likewise attached to both ends of a chain of atoms, the nitrogen together with the said chain constituting a heterocyclic nucleus. No explanation has been found for the peculiar relationship of the molecular structure of the compounds to their anti-oxident powers, but numerous tests have demonstrated the efficacy of substances possessing this molecular structure.

The substances belonging to the class defined above are extremely effective in retarding the deterioration of rubber. If employed in rubber compositions in the same proportions as most previously known anti-oxidants, they are far more effective, whereas small proportions of these substances are as effective as much larger proportions of previously known substances. They are odorless and do not impart an odor to a vulcanized rubber composition into which they have been incorporated. Many of these substances have practically no effect on the color of rubber, and hence may be employed in white or light-colored compositions without fear of darkening or staining.

*Example 1.*—As a specific example of one embodiment of the method of this invention, a typical tire tread composition was prepared containing: blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. This was divided into five portions, one of which was used as a control. To the others were added respectively 0.47, 0.95, 1.90, and 3.80 parts of p-hydroxy N-phenyl morpholine (¼%, ½%, 1%, and 2% of the weight of the composition). The compositions were thoroughly mixed, and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. In the table below T indicates ultimate tensile strength in pounds per sq. in. and E indicates ultimate elongation in per cent. of original length.

*Aging tests of p-hydroxy N-phenyl morpholine*

| Proportion of anti-oxidant | Before aging | | After 7 days in the Geer oven | | After 48 hours in the Bierer-Davis bomb | |
|---|---|---|---|---|---|---|
| | T | E | T | E | T | E |
| 0 | 3250 | 653 | 1860 | 493 | 690 | 347 |
| ¼% | 3400 | 657 | 2480 | 526 | 1520 | 470 |
| ½% | 3440 | 650 | 2990 | 560 | 2260 | 566 |
| 1% | 3500 | 660 | 3060 | 550 | 2780 | 597 |
| 2% | 3460 | 660 | 3280 | 590 | 2950 | 603 |

It is evident from the above example that rubber compositions containing even small proportions of this new anti-oxidant resist deterioration far more effectively than similar untreated compositions.

*Example 2.*—Two compositions were prepared containing the same constituents as the compositions of Example 1 above, except that the first contained no anti-oxidant, while the second contained 2 parts of p-nitroso N-phenyl morpholine as a combined accelerator and anti-oxidant, the hexamethylene-tetramine being omitted. The compositions were tested in the manner described in Example 1, after vulcanization for thirty minutes and forty-five minutes at 294° F.

*Aging tests of p-nitroso N-phenyl morpholine*

| Anti-oxidant | Before aging | | After 7 days in the Geer oven | | After 48 hours in the Bierer-Davis bomb | |
|---|---|---|---|---|---|---|
| | T | E | T | E | T | E |
| None (vulcanized 30 minutes) | 3475 | 676 | 1783 | 527 | 925 | 420 |
| p-nitroso N-phenyl morpholine (vulcanized 30 minutes) | 3441 | 643 | 2659 | 565 | 2191 | 537 |
| None (vulcanized 45 minutes) | 3600 | 623 | 1802 | 457 | 731 | 280 |
| p-nitroso N-phenyl morpholine (vulcanized 45 minutes) | 3402 | 580 | 2590 | 450 | 1860 | 433 |

It is evident that the rubber vulcanized in the presence of p-nitroso N-phenyl morpholine resists deterioration due to aging to a much greater degree than rubber vulcanized with other accelerators.

Obviously, the practice of this invention is not limited to the specific compositions given above, such compositions being merely illustrative of specific methods of employing the anti-oxidants of this invention. The proportions of the constituents may be varied, or other substances may be substituted therefor, since this invention is applicable to pure rubber or rubber compositions of the most varied nature. The anti-oxidants may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed certain preferred manners of performing my invention, I do not thereby desire or intend to limit myself solely thereto, for as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a compound possessing the structural formula

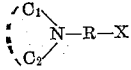

where $C_1$ and $C_2$ are terminal carbon atoms of a chain, and R is an aromatic nucleus, and X is a group selected from the class consisting of hydrogen, hydroxyl, nitroso, and amino groups.

2. The method of preserving rubber which comprises treating rubber with a compound possessing the structural formula

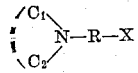

where $C_1$ and $C_2$ are terminal carbon atoms of a chain, R is an aromatic nucleus, and X is a group selected from the class consisting of hydroxyl, nitroso, and amino groups.

3. The method of preserving rubber which comprises treating rubber with a compound possessing the structural formula

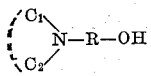

where $C_1$ and $C_2$ are terminal carbon atoms of a chain containing only monovalent substituents which do not possess double bonds, and R is a p-arylene group.

4. The method of preserving rubber which comprises treating rubber with a compound possessing the structural formula

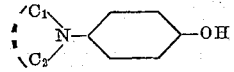

where $C_1$ and $C_2$ are terminal carbon atoms of a chain containing only monovalent substituents which do not possess double bonds.

5. The method of preserving rubber which comprises treating rubber with a compound possessing the structural formula

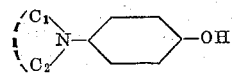

where $C_1$ and $C_2$ are terminal carbon atoms of a saturated chain, the atoms constituting the chain containing only monovalent substituents which do not possess double bonds.

6. The method of preserving rubber which comprises treating rubber with a compound possessing the structural formula

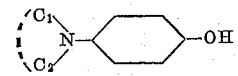

where $C_1$ and $C_2$ are terminal carbon atoms of a saturated 5-membered chain.

7. The method of preserving rubber which comprises treating rubber with p-hydroxy N-phenyl morpholine.

8. A composition of matter comprising rubber and a compound possessing the structural formula

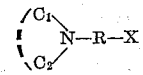

where $C_1$ and $C_2$ are terminal carbon atoms of a chain, and R is an aromatic nucleus and X is a group selected from the class consisting of hydrogen, hydroxyl, nitroso and amino groups.

9. A composition of matter comprising rubber and a compound possessing the structural formula

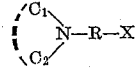

where $C_1$ and $C_2$ are terminal carbon atoms of a chain, R is an aromatic nucleus, and X is a substituent selected from the class consisting of hydoxyl, nitroso, and amino groups.

10. A composition of matter comprising rubber and a compound possessing the structural formula

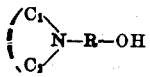

where $C_1$ and $C_2$ are terminal carbon atoms of a chain, containing only monovalent substituents which do not possess double bonds, and R is a p-arylene group.

11. A composition of matter comprising rubber and a compound possessing the structural formula

where $C_1$ and $C_2$ are terminal carbon atoms of a chain containing only monovalent substituents which do not possess double bonds.

12. A composition of matter comprising rubber and a compound possessing the structural formula

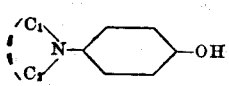

where $C_1$ and $C_2$ are terminal carbon atoms of an unsubstituted, saturated chain.

13. A composition of matter comprising rubber and p-hydroxy N-phenyl morpholine.

14. A vulcanized rubber product resulting from the vulcanization of a composition comprising rubber, a vulcanizing agent, and a compound possessing the structural formula

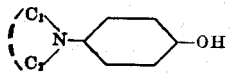

where $C_1$ and $C_2$ are terminal carbon atoms of a chain, the atoms constituting the chain containing only monovalent substituents which do not possess double bonds.

15. A vulcanized rubber product resulting from the vulcanization of a composition comprising rubber, a vulcanizing agent, an accelerator of vulcanization, and p-hydroxy N-phenyl morpholine.

16. The method of preserving rubber which comprises treating rubber with an N-aryl morpholine containing a hydroxyl substituent on the aryl group.

17. The method of preserving rubber which comprises treating rubber with a p-hydroxy substituted, N-aryl morpholine.

18. A composition of matter comprising rubber and an N-aryl morpholine containing a hydroxyl substituent on the aryl group.

19. A composition of matter comprising rubber and a p-hydroxy substituted, N-aryl morpholine.

In witness whereof I have hereunto set my hand this 5th day of October, 1929.

MARION C. REED.